United States Patent [19]
Tobita et al.

[11] Patent Number: 5,239,529
[45] Date of Patent: Aug. 24, 1993

[54] MULTIPLE BEAM OPTICAL DISK APPARATUS WITH MULTIPLE CLOCK EXTRACTING CIRCUITS USED FOR MONITORING AND CROSS FADING

[75] Inventors: Satoru Tobita, Kanagawa; Teruaki Higashihara, Tokyo; Kazuyuki Hishida; Masaru Tezuka, both of Kanagawa, all of Japan

[73] Assignee: Sony Corporation, Tokyo, Japan

[21] Appl. No.: 607,030

[22] Filed: Oct. 31, 1990

[30] Foreign Application Priority Data

Nov. 4, 1989 [JP] Japan .................................. 1-287655

[51] Int. Cl.⁵ .............................................. G11B 7/00
[52] U.S. Cl. .................................... 369/48; 369/44.38; 369/54; 369/106; 369/124
[58] Field of Search ................ 369/13, 44.37, 44.38, 369/48, 54, 58, 106, 112, 124; 358/339

[56] References Cited

U.S. PATENT DOCUMENTS

| | | | |
|---|---|---|---|
| 4,283,777 | 8/1981 | Curry et al. | 369/44.37 X |
| 4,459,690 | 7/1984 | Corsover et al. | 369/44.38 X |
| 4,571,716 | 2/1986 | Szerlip | 369/44.38 X |
| 4,706,235 | 11/1987 | Melbye | 369/44.37 |
| 4,841,379 | 6/1989 | Akiyama | 358/339 X |
| 4,853,914 | 8/1989 | Okano et al. | 358/339 X |
| 4,959,825 | 9/1990 | Okano | 358/339 X |

*Primary Examiner*—W. R. Young
*Attorney, Agent, or Firm*—Lewis H. Eslinger; Jay H. Maioli

[57] ABSTRACT

A disk recording and reproducing apparatus using two light beams has a disk driving section for loading a disk-shaped record medium having recording tracks and for rotating the disk-shaped record medium, an optical system having a light beam generating source, a light beam splitting device for splitting a light beam to provide at least a main beam and a sub beam, an optical path forming device for respectively causing the main beam and the sub beam to become incident on two adjacent recording tracks in the disk-shaped record medium loaded on the disk driving section and a photo-detecting device for detecting the condition that at least the sub beam from the disk-shaped record medium loaded on the disk driving section is affected by the recording track. Also provided is a disk rotation control section for controlling the disk driving section such that a relative moving speed of the recording track relative to the main beam incident on the recording track becomes constant, a recording operation section causing the information to be recorded on the recording track on which the main beam becomes incident, and a reproducing operation section for generating a read-out information signal based on a detected output of the sub beam from the photo-detecting device. The resultant read-out information signal is written in a memory at a rate corresponding to the read-out information signal and the read-out information signal written in the memory is read out again at a predetermined reading rate to generate a reproduced information output.

2 Claims, 5 Drawing Sheets

MULTIPLE BEAM OPTICAL DISK APPARATUS WITH MULTIPLE CLOCK EXTRACTING CIRCUITS USED FOR MONITORING AND CROSS FADING

BACKGROUND OF THE INVENTION

1. Field of the Invention

The present invention generally relates to apparatus for recording information in a disk-shaped record medium in which information can be recorded and from which the recorded information can be read-out and for reproducing the same therefrom and, more particularly, to a disk recording and reproducing apparatus using two laser beams.

2. Description of the Prior Art

As an information record medium, a so-called write once optical disk is proposed. According to this write once optical disk which is already available as a product information can be recorded thereon and reproduced therefrom by using an optical or laser beam. Of such write once optical disks, a magneto-optical disk is known, in which information can be repeatedly written. Such magneto-optical disk is comprised of a substrate, a vertical magnetization layer which forms a recording layer on the surface of the substrate and a protecting layer protecting the vertical magnetization layer. This magneto-optical disk is generally shaped as a disk. Information is written in the vertical magnetization layer on a recording track forming portion of the disk to record the information and the information written in the vertical magnetization layer on the recording track forming portion is read-out to reproduce the information.

When information is written in the magneto-optical disk, the magneto-optical disk is rotated about its central portion at a predetermined revolution speed. Under the condition that a predetermined external magnetic field acts on the vertical magnetization layer on the recording track forming portion, a laser beam is introduced onto the vertical magnetization layer, and the vertical magnetization layer on the recording track forming portion at its portion illuminated with the laser light beam is magnetized in the direction corresponding to the direction of the external magnetic field in accordance with the resultant rise of temperature. Then, if the magnetic field modulation recording system is employed in which the external magnetic field is changed in response to recording information under the condition that an intensity of laser beam is substantially constant or the optical modulation recording system is employed in which the laser light beam is changed in intensity in response to a recording information under the condition that the external magnetic field is substantially constant, magnetization direction inverting regions of a predetermined pattern are formed on the vertical magnetization layer on the recording track forming portion, the information being thereby recorded on the magneto-optical disk.

When the information recorded on the magneto-optical disk is read-out, a laser light beam of intensity less than that of the recording laser light beam is introduced onto the vertical magnetization layer on the recording track forming portion and a reflected laser light beam from the vertical magnetization layer on the recording track forming portion is detected by a photodetecting section so that the photo-detecting section derives a read-out signal corresponding to the information written in the magneto-optical disk. When the information is read-out as described above, the reflected laser light beam from the vertical magnetization layer on the recording track forming portion produces a rotation of a polarizing plane in response to the magnetization direction inverting pattern in the vertical magnetization layer corresponding to the written information due to the Kerr effect. Such rotation of polarizing plane is detected by detecting and comparing respective orthogonal polarized components of, for example, the reflected laser light beam, and a read-out signal is formed on the basis of a compared output which is changed in response to the rotation of the polarizing plane.

In the disk recording and reproducing apparatus for recording an information on the magneto-optical disk or reproducing the information from the magneto-optical disk, when the magneto-optical disk is rotated at the predetermined rotational speed and the laser light beam becomes incident on the vertical magnetization layer of the record track forming portion under the condition that the predetermined external magnetic field is applied to the vertical magnetization layer on the recording track forming portion thereby to record a new information on the magneto-optical disk, it is desirable to monitor the information being recorded in the magneto-optical disk in order to confirm the recorded condition of the information. Further, when the information already recorded on the magneto-optical disk is partially varied, corrected or new information is additionally recorded on the magneto-optical disk, a so-called search playback is required to read-out the information recorded on the magneto-optical disk at its recording position preceding the recorded position on the recording track in order to detect the position at which the additional recording or the like is carried out.

To this end, the following disk recording and reproducing apparatus is proposed.

According to this conventional disk recording and reproducing apparatus, when new information is recorded on the magneto-optical disk or the information already recorded on the magneto-optical disk is partially varied, corrected or when new information is additionally recorded on the magneto-optical disk, two laser light beams of an information writing laser light beam and an information reading laser light beam are respectively emitted from two laser light emitting elements and introduced into the magneto-optical disk independently. When new information is recorded on the magneto-optical disk, the information written in the vertical magnetization layer on the recording track forming portion of the magneto-optical disk on the basis of the information writing laser light beam is read-out from the recording track forming portion of the magneto-optical disk by the information reading laser light beam thereby to obtain a reproduced information signal, and the information recorded on the magneto-optical disk by the information writing laser light beam is monitored on the basis of the above-described reproduced information signal. Further, when the information already recorded on the magneto-optical disk is partially varied, corrected or an information is additionally recorded on the magneto-optical disk, the so-called search playback is performed on the information recorded on the vertical magnetization layer on the recording track forming portion of the magneto-optical disk by the information reading laser light beam thereby to obtain a reproduced information signal. Then, a position at which the recorded information should be partially changed, corrected or the new information should be additionally recorded by the use of the information writing laser beam is detected on the basis of such reproduced information signal.

However, the disk recording and reproducing apparatus in which the two laser light beams of the information writing laser light beam and the information reading laser light beam are respectively generated from the two laser emitting elements and are independently introduced onto the magneto-optical disk unavoidably encounters the following problems. That is two optical systems including two laser emitting elements and control sections for the respective optical systems are needed in order to generate and control the two laser light beams of the information writing laser light beam and the information reading laser light beam, which necessitates a complicated arrangement of optical system and also a complicated arrangement and operation of the control system. Furthermore, there is the substantial disadvantage that a focusing control and a tracking control are not carried out in a stable manner.

In order to remove the aforementioned shortcomings, the assignee of the present application has proposed the following improved disk recording and reproducing apparatus (see Japanese Patent Application No. 63-327357).

According to this previously-proposed disk recording and reproducing apparatus, information is recorded by writing an information in recording tracks of a rotating magneto-optical disk and an information is reproduced by reading-out an information written in the recording tracks of the rotating magneto-optical disk. One light beam from a light beam generating source is split to provide at least two light beams and two light beams are respectively introduced into the rotating magneto-optical disk adjacent two recording tracks, whereby information is recorded in the recording track on which one of the two light beams introduced into the magneto-optical disk becomes incident, while recorded information is reproduced on the basis of a detected output which results from detecting the change in which the other light beam of the two light beams incident on the magneto-optical disk is affected by the recording track. Therefore, the new information recorded in the magneto-optical disk can be monitored and the search playback for partly changing or correcting the information recorded on the magneto-optical disk or for performing additional recording can be performed with ease by an inexpensive optical system of a relatively simple arrangement which utilizes a single light beam generating source and a control system therefor.

As described above, in the disk recording and reproducing apparatus in which one of the two light beams, provided by splitting one light beam from the laser beam generating source, is related to the recording of information on the magneto-optical disk and the other light beam is related to the reproduction of information from the magneto-optical disk, a special problem will not occur if the information is recorded on and reproduced from the magneto-optical disk under the condition that the magneto-optical disk is rotated at a constant rotational speed regardless of the position at which the information recording light beam becomes incident on the radial direction of the magneto-optical disk. However, if the information is recorded on and reproduced from the magneto-optical disk under the condition that the magneto-optical disk is rotated at a rotational speed this is changing in response to the incident position of the information recording light beam on the radial direction of the magneto-optical disk so as to provide a constant relative moving speed between the recording track and the information recording light beam incident on the recording track, that is, so as to cause the information recording light beam to be introduced onto the recording track at a constant linear velocity, the information is read-out from the recording track of the magneto-optical disk by an information reproducing light beam at a linear velocity different from a linear velocity of the information recording light beam used to record the information on the recording track upon recording, that is, at a linear velocity of the information reproducing light beam relative to the recording track. There is then the substantial risk that the information cannot be properly reproduced from the magneto-optical disk on the basis of the detected output which results from detecting the information reproducing light beam.

OBJECTS AND SUMMARY OF THE INVENTION

Accordingly, it is an object of the present invention to provide an improved disk recording and reproducing apparatus in which the aforenoted shortcomings and disadvantages of the prior art can be substantially eliminated.

More specifically, it is an object of the present invention to provide a disk recording and reproducing apparatus using two laser beams in which an optical system using a single laser beam generating source and a control system thereof can be simplified in arrangement and can be made inexpensive.

It is another object of the present invention to provide a disk recording and reproducing apparatus in which the recorded condition of information on a disk-shaped record medium can be monitored properly and with ease.

It is still another object of the present invention to provide a disk recording and reproducing apparatus in which a so-called search playback can be carried out properly and with ease in order to partly change or correct the recorded information and to additionally record new information on the recorded information.

According to an aspect of the present invention, a disk recording and reproducing apparatus using two light beams is comprised of a disk driving section for loading thereon a disk-shaped record medium having recording tracks in and from which information is recorded and reproduced and for rotating the disk-shaped record medium, an optical system arrangement section comprised of a light beam generating source, a light beam splitting device for splitting a light beam from the light beam generating source to provide at least a main beam and a sub beam, and an optical path forming device for respectively causing the main beam and the sub beam to become incident on two preceding and succeeding recording tracks in the disk-shaped record medium loaded on the disk driving section and a photo-detecting device for detecting the condition that at least the sub beam from the disk-shaped record medium loaded on the disk driving section is affected by the recording track, a disk rotation control section for controlling the disk driving section such that a relative moving speed of the recording track on the disk-shaped record medium rotated by the disk driving section relative to the main beam incident on the recording track becomes constant, a recording operation section supplied with an information to be recorded and causing the information to be recorded on the recording track on which the main beam becomes incident, and a reproducing operation section for generating a read-out information signal based on a detected output of the sub beam from the photo-detecting device, writing a resultant read-out information signal in a memory at a writing rate corresponding to the read-out information signal and reading the read-out information signal written in the memory at a predetermined reading rate to generate a reproduced information output.

The above, and other objects, features and advantages of the present invention will be apparent in the following detailed description of an illustrative embodiment to be taken in conjunction with the accompanying drawings, in which like reference numerals are used to identify the same or similar parts in the several views.

BRIEF DESCRIPTION OF THE DRAWINGS

FIG. 1 (formed of FIGS. 1A and 1B drawn on two sheets of drawings to permit the use of a suitably large scale) is a structural diagram showing an embodiment of a disk recording and reproducing apparatus according to the present invention;

FIG. 3 (formed of FIGS. 3A and 3B with FIG. 3A to the left of and partly overlapping FIG. 3B) is a block diagram showing examples of specific arrangements of the photo-detecting section and the signal processing circuit section utilized in the embodiment of FIG. 1.

DETAILED DESCRIPTION OF THE PREFERRED EMBODIMENT

An embodiment of a disk recording and reproducing apparatus according to the present invention will now be described with reference to the accompanying drawings.

Figures 1, 1A:
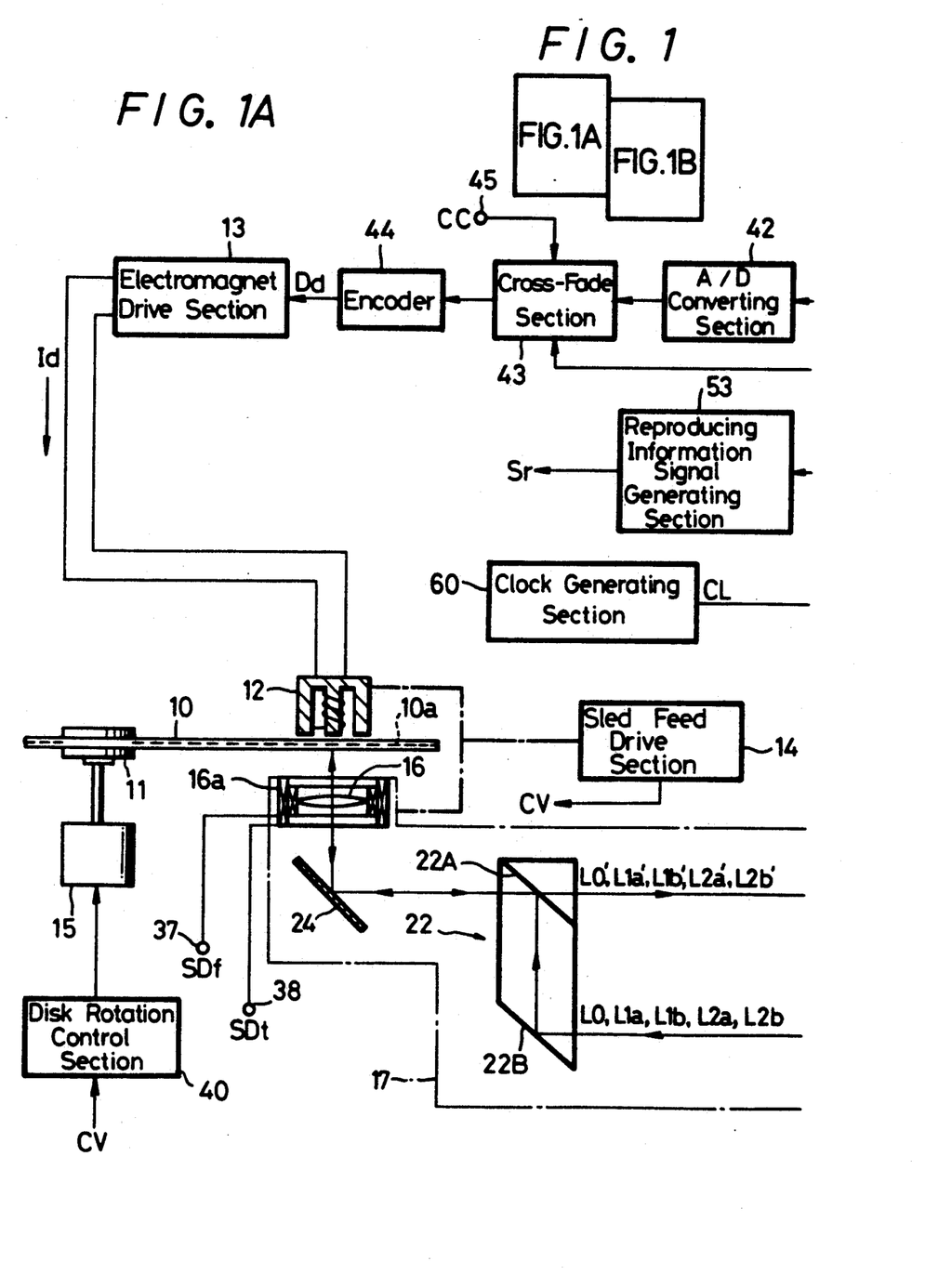
Figure 1B:
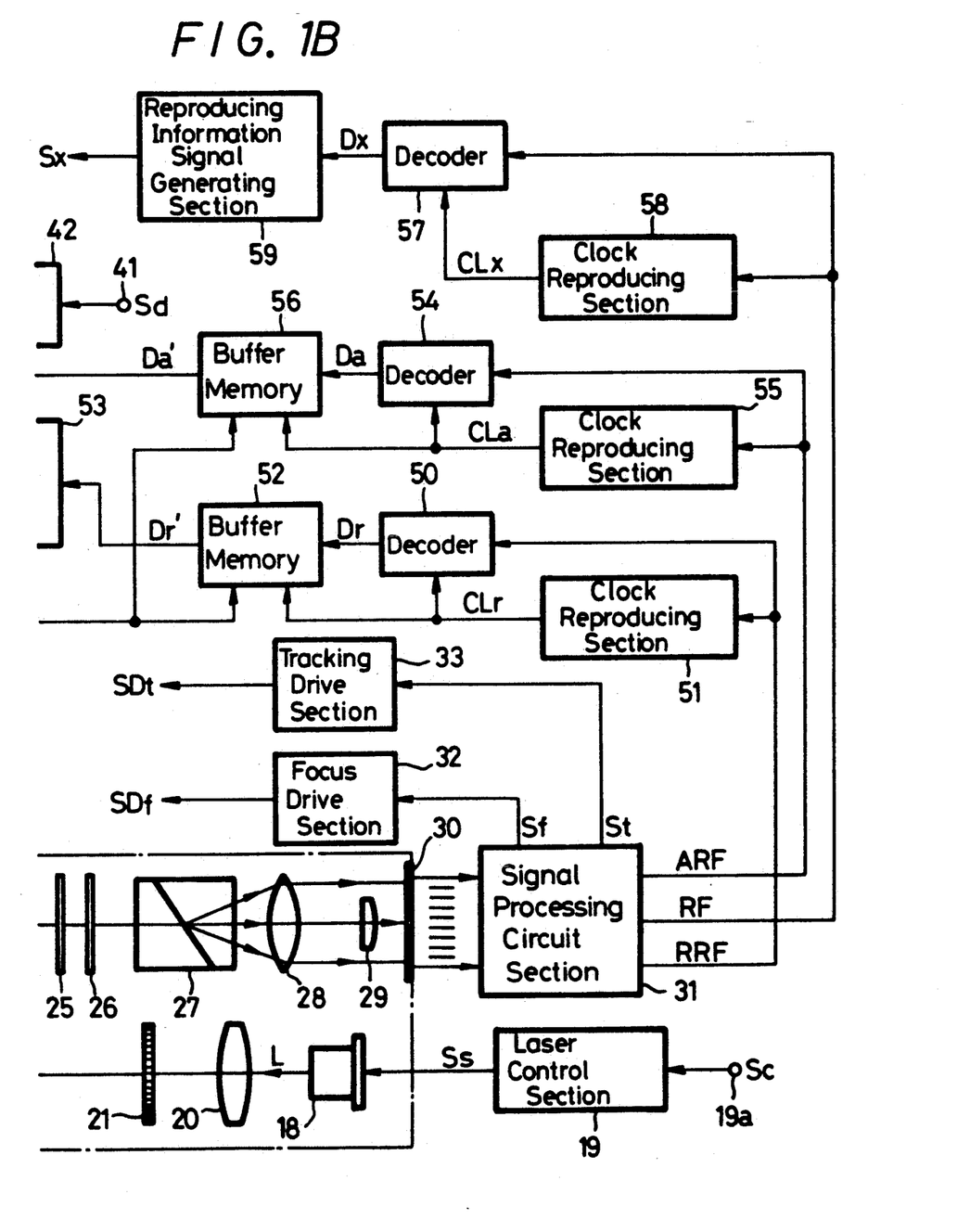

FIG. 1 (formed of FIGS. 1A and 1B drawn on two sheets of drawings to permit the use of a suitably large scale) is a structural diagram showing an overall arrangement of the disk recording and reproducing apparatus of the present invention.

Referring to FIG. 1, in this embodiment, a magneto-optical disk 10 is loaded at a central portion thereof on a disk-shaped loading portion 11. The disk loading portion 11 is made freely rotatable about a rotary shaft thereof and is rotated at a predetermined rotational speed, which will be described later, by a motor 15 whose revolution rate is controlled by a disk rotation control section 40. The disk loading portion 11, the motor 15 and the disk rotation control section 40 constitute a disk driving section which rotates the magneto-optical disk 10 loaded on the disk loading portion 11 at the predetermined rotational speed.

In the magneto-optical disk 10, a number of annular recording tracks are formed around a central portion of a vertical magnetization layer which forms a recording track forming regions 10a. One annular recording track will hereinafter be referred to as one recording track.

Above the magneto-optical disk 10 held on the disk loading portion 11, an electromagnet 12 is located to become movable in the radial direction of the magneto-optical disk 10. The electromagnet 12 forms a magnetic field generating portion which supplies the recording track forming region 10a of the magneto-optical disk 10 with a magnetic field whose intensity is changed in response to the information to be recorded on the magneto-optical disk 10. The electromagnet 12 is supplied at its coil portion with a drive current Id from an electromagnet driving portion 13.

A recording information signal Sd applied to an input terminal 41 is supplied to an analog-to-digital (A/D) converting section 42, in which it is converted into a digital signal. This digital signal is supplied through a cross-fade circuit 43 to an encoder 44 and is thereby encoded to provide recording information data Dd. This recording information data Dd is supplied to the electromagnet driving section 13. Having received the recording information data Dd from the encoder 44, the electromagnet driving section 13 forms the drive current Id whose level is changed in response to the recording information data Dd and supplies the same to the coil of the electromagnet 12. Thus, the electromagnet 12 generates a magnetic field whose intensity is changed with the recording information data Dd and applies the same magnetic field to the recording track forming region 10a of the magneto-optical disk 10.

An optical system arrangement section 17 including an objective lens 16 is provided relative to the magneto-optical disk 10 held on the disk loading portion 11. The optical system arrangement section 17 and the electromagnet 12 are driven by a sled drive section 14 so that this optical system arrangement section 17 can be moved in the radial direction of the magneto-optical disk 10 in association with the movement of the electromagnet 12 in the radial direction of the magneto-optical disk 10. The objective lens 16 in the optical system arrangement section 17 is opposed to the electromagnet 12 across the magneto-optical disk 10 held on the disk loading portion 11. The objective lens 16 is adjusted by an optical beam control means 16a which includes focus control means and tracking control means, such that the objective lens 16 is made closer to or is made distant from the magneto-optical disk 10 along the optical axis of the objective lens 16. Also, the position of the objective lens 16 can be adjusted in the radial direction of the magneto-optical disk 10, or in the direction perpendicular to its optical axis.

A laser element 18 is provided within the optical system arrangement section 17, and this laser element 18 is driven by a laser control section 19 to emit a laser beam of a predetermined wavelength. The laser control section 19 responds to a control signal Sc applied thereto through a terminal 19a to supply a drive signal Ss to the laser element 18 so that the laser element 18 emits a laser beam L of proper power and whose intensity is substantially constant.

Within the optical system arrangement section 17, the laser beam L of substantially constant intensity emitted from the laser element 18 is collimated by a collimator lens 20 and is introduced into a diffraction grating 21, in which it is diffracted to provide five laser beams in total. These five laser beams are a0'th order light beam L0 of a main beam, a pair of primary diffracted light beams L1a and L1b which are sub-beams across the 0'th order light beam L0 and a pair of secondary diffracted light beams L2a and L2b across the 0'th order light beam L0 and the pair of primary diffracted light beams L1a and L1b. In FIG. 1, these five laser beams are represented by one solid line for simplicity. In that case, the laser beam L emitted from the laser element 18 is split into the 0'th order laser beam L0, the primary diffracted laser beams L1a and L1b and the secondary diffracted laser beams L2a and L2b such that the intensity of the 0'th order laser beam L0 becomes sufficiently larger than those of the primary diffracted laser beams L1a, L1b and the secondary diffracted laser beams L2a, L2b. By way of example the ratio of intensity among the 0'th order laser beam L0, the primary diffracted laser beams L1a, L1b and the secondary diffracted laser beams L2a, L2b is presented as, for example, 50 :9.7:6.6.

The 0'th order laser beam L0, the primary diffracted laser beams L1a, L1b and the secondary diffracted laser beams L2a, L2b from the diffraction grating 21 are respectively reflected on boundary surface portions 22B and 22A of a beam splitter 22, further reflected by a mirror 24 and then introduced into the objective lens 16.

Figure 2:
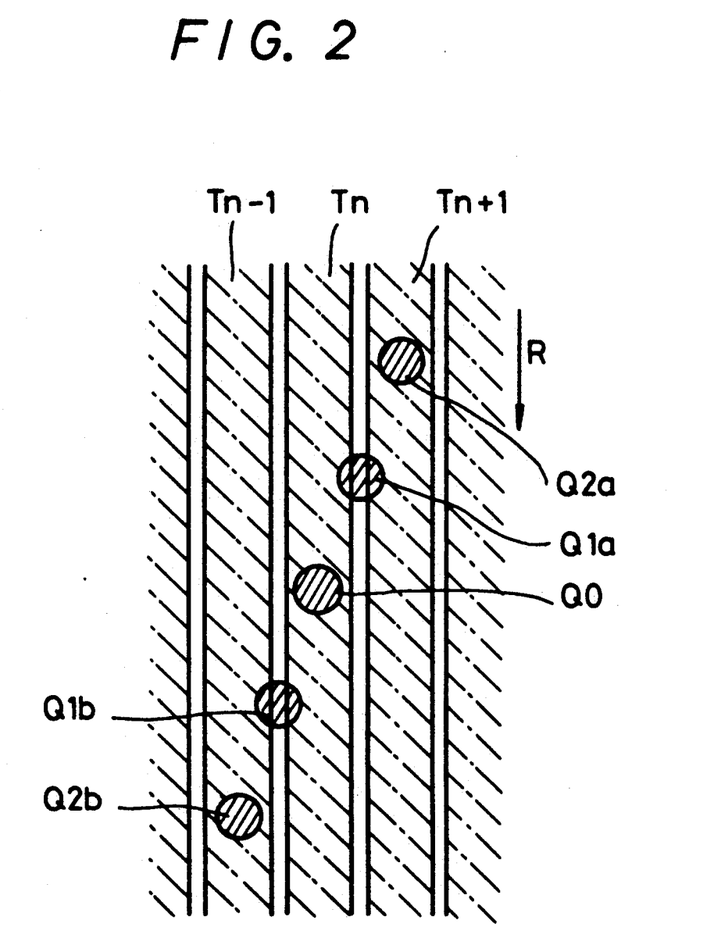
FIG. 2 is a schematic diagram used to explain light or laser beams illuminated on a magneto-optical disk by the disk recording and reproducing apparatus shown in FIG. 1.

The 0'th order laser beam L0, the primary diffracted laser beams L1a, L1b and the secondary diffracted laser beams L2a, L2b incident on the objective lens 16 are converged by the objective lens 16 and are then introduced into the recording track forming region 10a of the magneto-optical disk 10. In that case, five laser beams formed of the 0'th order laser beam L0, the primary diffracted laser beams L1a, L1b and the secondary diffracted laser beams L2a, L2b are intersected on recorded tracks formed on the recording track forming region 10a of the magneto-optical disk 10 with predetermined angles. The 0'th order laser beam L0 and the secondary diffracted laser beams L2a and L2b reach three adjacent recording tracks while the 0'th order laser beam L0 reaches the central recording track. Also, the primary diffracted laser beams L1a, L1b reach adjacent two tracks of the three tracks to which the 0'th order laser beam L0 and the secondary diffracted laser beams L2a, L2b are reached, that is, they reach the three recording tracks at two side edge portions of the central recording track to which the 0'th order laser beam L0 is reached. Thus, as shown, for example, in FIG. 2, under the condition that the 0'th order laser beam L0 reaches the recording track $T_n$ formed on the recording track forming region 10a of the magneto-optical disk 10 rotating in the direction shown by an arrow R thereby to form a beam spot Q0 of the 0'th order laser beam L0 on the recording track $T_n$, the secondary diffracted laser beam L2a reaches the advanced recording track $T_{n+1}$ adjacent to the recording track $T_n$ to form beam Q2a and the secondary diffracted laser beam L2b reaches the delayed recording track $T_{n-1}$ adjacent to the recording track $T_n$ to form a beam spot Q2b of the secondary diffracted laser beam L2b on the recording track $T_{n-1}$. Further, the primary diffracted laser beam L1a reaches the position between the recording track $T_n$ and the adjacent advanced recording track $T_{n+1}$ to form a beam spot Q1a of the primary diffracted laser beam L1a on both the recording tracks $T_n$ and $T_{n+1}$. Also, the primary diffracted laser beam L1b reaches the position between the recording track $T_n$ and the adjacent delayed recording track $T_{n-1}$ thereby to form a beam spot Q1b of the primary diffracted laser beam L1b on both the recording tracks $T_n$ and $T_{n-1}$.

Under this condition, the sled feed drive section 14 supplies the disk rotation control section 40 with a control signal CV corresponding to the incident position at which the 0'th order laser beam L0, which is the main beam in the recording track forming region 10a of the magneto-optical disk 10, is introduced into the radial direction of the magneto-optical disk 10. The disk rotation control section 40 drives the motor 15 to rotate the magneto-optical disk 10 so that the magneto-optical disk 10 is rotated at a rotational speed which changes in response to the position in the radial direction of the magneto-optical disk 10 in which the 0'th order beam L0 becomes incident on the recording track forming region 10a of the magneto-optical disk 10. Accordingly, the 0'th order laser beam L0 becomes incident on the recording track forming region 10a of the magneto-optical disk 10 at a constant linear velocity relative to the recording track.

The 0'th order laser beam L0, which is the main beam, and the primary diffracted laser beams L1a, L1b and the secondary diffracted laser beams L2a, L2b which are sub-beams, incident on the recording track forming region 10a of the magneto-optical disk 10 are respectively reflected on the recording track forming region 10a and provided as a reflected primary diffracted laser beam L10', reflected primary diffracted laser beams L1a', L1b' and reflected secondary diffracted laser beams L2a', L2b', respectively. These reflected laser beams are returned through the objective lens 16 to the optical system arrangement section 17. The reflected 0'th order laser beam L0', the reflected primary diffracted laser beams L1a', L1b' and the reflected secondary diffracted laser beams L2a', L2b' returned to the optical system arrangement section 17 are reflected by the mirror 24, introduced into the beam splitter 22, travelled through the boundary surface portion 22A of the beam splitter 22, travelled through a phase compensating plate 25 and a ½ wavelength plate 26 and then introduced into a three-beam analyzer 27.

As is described, for example, in Japanese Patent Laid-Open Gazette No. 63-127436, this three-beam analyzer 27 receives one incident light beam and produces three emitted light beams, that is, two light beams formed of respective S-polarized component and P-polarized component which are orthogonal polarized components of one incident light beam and one light beam composed of S-polarized component and P-polarized component.

Each of the reflected 0'th order laser beam L0', the reflected primary diffracted laser beams L1a', L1b' and the reflected secondary diffracted laser beams L2a', L2b, incident on the three-beam polarizer 27 is split, thereby to provide three laser beams, that is, two laser beams, which are formed of S-polarized component and P-polarized component as orthogonal polarized components, and one laser beam, which results from synthesizing an S-polarized component and a P-polarized component. These laser beams are travelled through a converging lens 28 and the two laser beams formed of the S-polarized component and the P-polarized component are directly supplied to a photodetecting section 30, and one laser beam, which results from synthesizing the S-polarized component and the P-polarized component, is introduced through a cylindrical lens 29 to the photodetecting section 30.

The photodetecting section 30 generates respective photodetected output signals which are corresponding to the light beam formed of S-polarized component, the light beam formed of P-polarized component and the light beam, which results from synthesizing S-polarized component and P-polarized component for the reflected 0'th order light beam L0' and the reflected secondary diffracted light beam L2a'. Further, for the reflected primary diffracted light beams L1a' and L1b', the photodetecting section 30 generates a detected output signal corresponding to the change of the light beam which results from synthesizing S-polarized component and P-polarized component thereof. Furthermore, for the reflected secondary diffracted light beam L2b', the photodetecting section 30 generates detected output signals corresponding to the change of the light beam formed of the S-polarized component and the light beam formed of P-polarized component. The detected output signals are supplied to a signal processing circuit section 31 coupled to the optical system arrangement section 17.

On the basis of the detected output signals with respect to S-polarized component and P-polarized component obtained from the reflected 0'th order light beam L0', detected output signals with respect to light beams formed of the S-polarized component and P-polarized component obtained from the reflected secondary diffracted light beam L2a' and detected output signals with respect to light beams formed of the S-polarized component and P-polarized component obtained from the reflected secondary diffracted light beam L2b', the signal processing circuit section 31 detects the rotations of the polarized planes of the reflected 0'th order laser beam L0', the reflected secondary diffracted laser beam L2a' and the reflected secondary diffracted laser beam L2b' by the recording tracks formed on the recording track forming region 10a of the magneto-optical disk 10. Then, a read-out information signal RF which changes in response to the rotation of the polarized plane of the detected reflected 0'th order laser beam L0', a read-out information signal ABF which changes in response to the rotation of the polarized plane of the detected reflected secondary diffracted laser beam L2a' and a read-out information signal RRF which changes in response to the rotation of the polarized plane of the detected reflected secondary diffracted laser beam L2b' are generated from the signal processing circuit section 31. These read-out information signals RF, ARF and RRF are selectively transmitted from the signal processing circuit section 31.

On the basis of a detected output signal with respect to a light beam which results from mixing the S-polarized component and P-polarized component of the reflected 0'th order laser beam L0' supplied thereto through the cylindrical lens 29 from the photo-detecting portion 30 through the signal processing circuit section 31 generates a focusing error signal Sf corresponding to the focused condition of the 0'th order laser beam L0 on the recording track forming region 10a of the magneto-optical disk 10. Further, on the basis of a detected output signal with respect to a light beam which results from mixing the S-polarized component and P-polarized component obtained from the reflected 0'th order laser beam L0' from the photo-detecting section 30 and a detected output signal with respect to a light beam which results from mixing S-polarized component and P-polarized component obtained from one of the reflected primary diffracted laser beams L1a' and L1b', the signal processing circuit section 31 generates a tracking error signal St corresponding to the condition that the 0'th order laser beam L0 follows the recording tracks in the recording track forming region 10a of the magneto-optical disk 10. The focusing error signal Sf is supplied to a focus driving section 32 from the signal processing circuit section 31, and the tracking error signal St is supplied to a tracking drive section 33 from the signal processing circuit section 31.

The focus drive section 32 generates a focus drive signal SDf on the basis of the focusing error signal Sf and supplies the same to a focus control means in the laser beam control means 16a by way of a terminal 37 led out from the laser beam control means 16a. Further, the tracking drive section 33 generates a tracking drive signal SDt on the basis of the tracking error signal St and supplies the same to a tracking control means in the laser beam control means 16a by way of a terminal 38 led out from the laser beam control means 16a.

When an information is recorded on the magneto-optical disk 10 under this condition, a magnetic field generated by the electromagnet 12 and whose intensity changes in response to the recording information signal is applied to the portions within the recording track forming region 10a of the magneto-optical disk 10 in which the 0'th order laser beam L0' the primary diffracted laser beams L1a and L1b and the secondary diffracted laser beams L2a and L2b are introduced. Simultaneously, on the basis of the control signal Sc, the laser control section 19 supplies the laser element 18 with a drive signal Ss so that the laser element 18 generates a laser light beam L to make the 0'th order laser beam L0 have a relatively large intensity.

In the recording mode in which a new information is continuously recorded on the magneto-opical disk 10, the signal processing circuit section 31 generates the read-out information signal RRF which is changed in response to the rotation of the polarized plane of the reflected secondary diffracted laser beam L2b' which results from reflecting the secondary diffracted laser beam L2b reached to the delayed recording track adjacent to the recording track which the 0'th order laser beam L0 reaches in the recording track region 10a of the magneto-optical disk 10. The read-out information signal RRF from the signal processing circuit section 31 is supplied to a decoder 50 and a clock reproducing section 51.

The clock reproducing section 51 generates a clock signal CLr having a frequency corresponding to the clock frequency of the read-out information signal RRF, and this clock signal CLr is supplied to the decoder 50. Therefore, the decoder 50 decodes the read-out information signal RRF from the signal processing circuit 31 by the clock signal CLr to generate a reproduced digital information Dr. This reproduced digital information Dr is supplied to a buffer memory 52 and is written in the buffer memory 52 in response to the clock signal CLr used as a write clock. Under the condition that a reproducing processing clock signal CL having a frequency corresponding to the linear velocity of the 0'th order laser beam L0 incident on the recording track forming region 10a of the magneto-optical disk 10 relative to the recording track, that is, a frequency equal to the recording clock frequency of the information recorded on the recording track of the magneto-optical disk 10 is generated from a clock generating section 60 and is used as a read clock, the reproduced digital information Dr written in the buffer memory 52 is readout from the buffer memory 52 and is employed as a converted reproduction digital information Dr'.

Under the assumption that the information recorded on the recording track of the magneto-optical disk 10 is properly reproduced, the converted reproduction digital information Dr' is fed to a reproduced information signal generating section 53. Then, a reproduced information signal Sr is transmitted from the reproduced information signal generating section 53. Therefore, the information recorded in the recording track of the recording track forming region 10a of the magneto-optical disk 10 by the 0'th order laser beam L0 can be monitored by such reproduced information signal Sr.

In the recording mode in which the information already recorded on the recording track on the recording track forming region 10a of the magneto-optical disk 10 is partly changed, corrected or a new information is additionally recorded on that recording track, the signal processing circuit section 31 generates the read-out information signal ARF which is changed in response to the rotation of a polarized plane of the reflected secondary diffracted laser beam L2a' which results from reflecting the secondary diffracted laser beam L2a which reaches the advanced recording track adjacent to the recording track on which the 0'th order laser beam L0 becomes incident on the recording track forming region 10a of the magneto-optical disk 10. The read-out information signal ARF from the signal processing circuit section 31 is supplied to a decoder 54 and to a clock reproducing section 55.

The clock reproducing section 55 derives a clock signal CLa having a frequency corresponding to the clock frequency of the read-out information signal ARF, and this clock signal CLa is fed to the decoder 54. Thus, the decoder 54 decodes the read-out information signal ARF from the signal processing circuit section 31 by the clock signal CLa to generate a reproduced digital information Da. This reproduced digital information Da is written in a buffer memory 56 in response to the clock signal CLa provided as a write clock. Under the condition that a reproducing clock signal CL obtained from the clock generating section 60 is used as a read-out clock, the reproduced digital information Da written in the buffer memory 56 is read-out from the buffer memory 56 and is employed as a converted reproduced digital information Da'.

Assuming that the search playback is carried out to search the information recorded on the recording track of the magneto-optical disk 10 by the 0'th order laser beam L0 and the information recorded on the recording track is properly reproduced, the converted reproduction digital information Da' is supplied to a cross-fade section 43. In the cross-fade section 43 supplied with the converted reproduction digital information Da', the supply of a digitized output of the recording information signal Sd transmitted from an analog-to-digital (A/D) converting section 42 in response to the converted reproduction digital information Da' to the encoder 44 is controlled in accordance with a recording control signal CC supplied thereto from a terminal 45. Consequently, in the magneto-optical disk 10, the information already recorded on its recording track forming region 10a is partly changed, corrected or a new information is additionally recorded on that recording track.

When information is reproduced from the magneto-optical disk 10, the laser control section 19 responds to the control signal Sc to supply the drive signal Ss to the laser element 18 so that the laser element 18 generates the laser beam L by which the 0'th order laser beam L0 has a relatively small intensity so that it cannot form a magnetization direction inverting region on the vertical magnetization layer in which the recording track forming region 10a of the magneto-optical disk 10 is formed. While the signal processing circuit section 31 generates the read-out information signal RF which is changed in response to the rotation of a polarized plane of the reflected 0'th order laser beam L0' which results from reflecting the 0'th order laser beam L0 on the recording track forming region 10a of the magneto-optical disk 10.

The read-out information signal RF from the signal processing circuit section 31 is supplied to a decoder 57 and to a clock reproducing section 58.

The clock reproducing section 58 generates a clock signal CLx having a frequency corresponding to the clock frequency of the read-out information signal RF, and this clock signal CLx is fed to the decoder 57. Thus, the decoder 57 decodes the read-out information signal RF from the signal processing circuit section 31 by the clock signal CLx to generate a reproduced digital information Dx. Then, the reproduced digital information Dx is supplied to a reproduced information signal generating section 59 and the reproduced information signal generating section 59 derives a reproduced information signal Sx. Therefore, the information recorded on each of the recording tracks on the recording track forming region 10a of the magneto-optical disk 10 is read-out by the 0'th order laser beam L0 and then reproduced.

Figures 3, 3A:
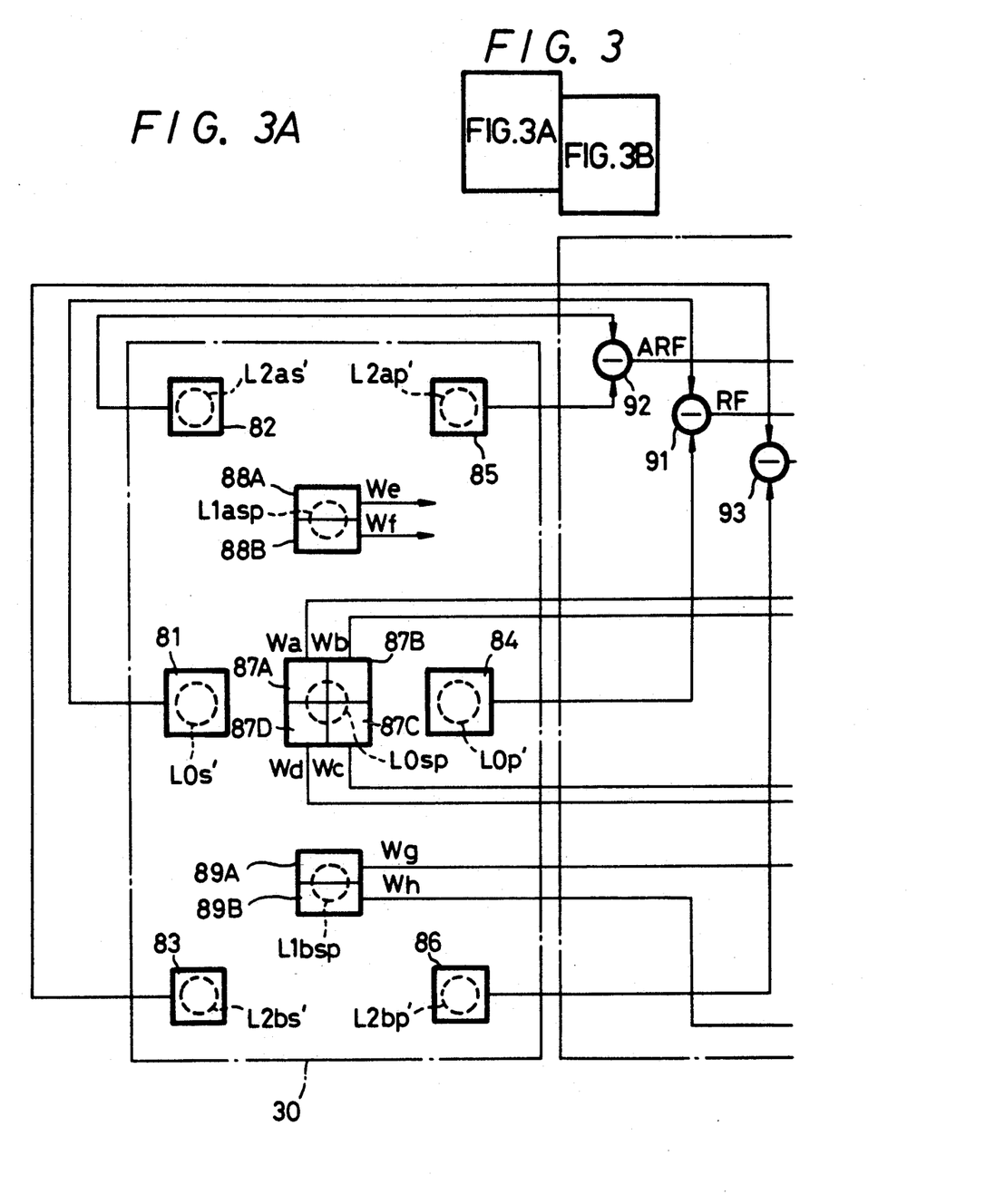

FIG. 3 shows examples of specific arrangements of the photodetecting section 30 and the signal processing circuit section 31 shown in the embodiment of FIG. 1. In that event, FIG. 3 is formed of FIGS. 3A and 3B drawn on two sheets of drawings to permit the use of a suitably large scale.

In the examples of the specific arrangements, as shown in FIG. 3A, the photo-detecting section 30 is comprised of a photosensitive element 81 which receives and detects a laser beam L0s' formed of S-polarized component obtained from the reflected 0'th order laser beam L0', a photo-sensitive element 82 which receives and detects a laser beam L2as' formed of S-polarized component obtained from the reflected secondary diffracted laser beam L2a', a photo-sensitive element 83 which receives and detects a laser beam L2bs' formed of S-polarized component obtained from the reflected secondary diffracted laser beam L2b', a photo-sensitive element 84 which receives and detects a laser beam L0p' of P-polarized component obtained from the reflected 0'th order laser beam L0', a photo-sensitive element 85 which receives and detects a laser beam L2ap' formed of P-polarized component obtained from the reflected secondary diffracted laser beam L2a', a photosensitive element 86 which receives and detects a laser beam L2bp' formed of P-polarized component obtained from the reflected secondary diffracted laser beam L2b', four photo-sensitive elements 87A, 87B, 87C and 87D which receive and detect a laser beam L0sp which results from synthesizing S-polarized component and P-polarized component obtained from the reflected 0'th order laser beam L0', a pair of photo-sensitive elements 88A and 88B which receive and detect a laser beam L1asp which results from synthesizing S-polarized component and P-polarized component obtained from the reflected primary diffracted laser beam L1a' and a pair of photo-sensitive elements 89A and 89B which receive and detect a laser beam L1bsp which results from synthesizing the S-polarized component and P-polarized component obtained from the reflected primary diffracted laser beam L1b'.

Figure 3B:
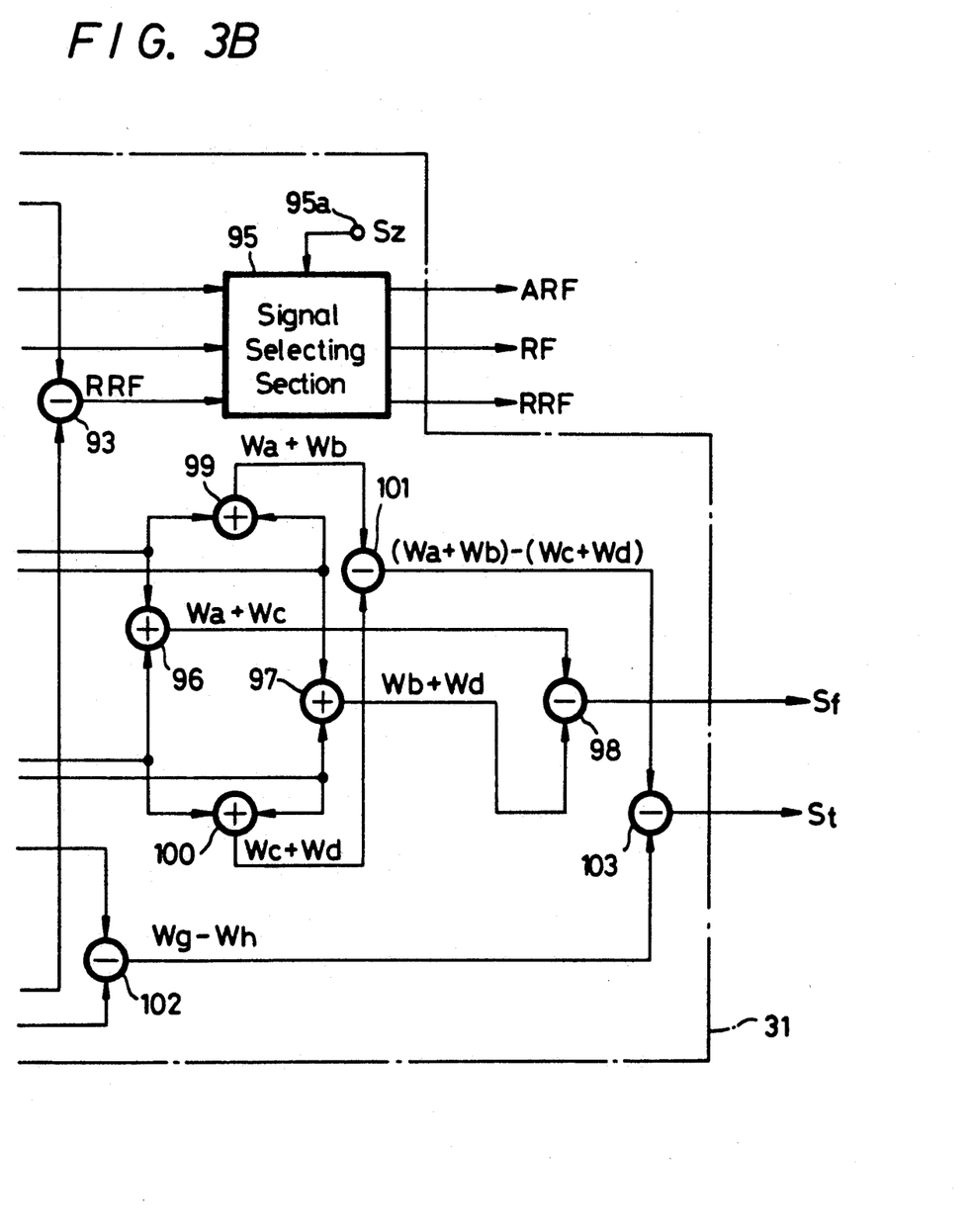

A detected output signal from the photo-sensitive element 81 and a detected output from the photo-sensitive element 84 are supplied to the signal processing circuit section 31 at its subtracting section 91 which subtracts the two detected output signals from each other. Thus, the subtracting section 91 generates the read-out information signal RF of the 0'th order laser beam L0. A detected output signal from the photo-sensitive element 82 and a detected output signal from the photo-sensitive element 85 are supplied to the signal processing circuit section 31 at its subtracting section 92 which subtracts the two detected output signals from each other. Thus, the subtracting section 92 generates the read-out information signal ARF formed of the secondary diffracted laser beam L2a. Further, a detected output signal from the photo-sensitive element 83 and a detected output signal from the photo-sensitive element 86 are supplied to the signal processing circuit section 31 at its subtracting section 93 which subtracts the two detected output signals from each other. Thus, the subtracting section 92 generates the read-out information signal RRF formed of the secondary diffracted laser beam L2b.

The read-out information signals RF, ARF and RRF are supplied to a signal selecting section 95, and the signal selecting section 95 selectively generates one of the read-out information signals RF, ARF and RRF in response to a selection control signal Sz supplied thereto from a terminal 95a. More specifically, in the recording mode in which new information is continuously recorded on the magneto-optical disk 10, the signal selecting section 95 derives the read-out information signal RRF. In the recording mode in which the information already recorded on the recording track of the recording track forming region 10a of the magneto-optical disk 10 is partly changed, corrected or a new information signal is additionally recorded on the recording track, the signal selecting section 95 derives the read-out information signal ARF. Furthermore, when the information is reproduced from the magneto-optical disk 10, the signal selecting section 95 derives the read-out information signal RF.

Detected output signals Wa, Wb, Wc and Wd from the photosensitive elements 87A to 87D, detected output signals We and Wf from the photo-sensitive elements 88A and 88B and detected output signals Wg and Wh from the photo-sensitive elements 89A and 89B are supplied to the signal processing circuit section 31.

That is, in the signal processing circuit section 31, the detected output signal Wa and the detected output signal Wc are supplied to an adding section 96 which generates a sum output signal Wa+Wc. The detected output signal Wb and the detected output signal Wd are supplied to an adding section 97 from which there is derived a sum output signal Wb+Wd. Then, a subtracting section 98 subtracts the sum output signal Wa+Wc and the sum output signal Wb+Wd from each other thereby to generate a difference output signal (Wa+Wc)−(Wb+Wd) as the focusing error signal Sf. In that case, on the basis of the reflected 0'th order laser beam L0', the focusing error signal Sf is generated according to a so-called astigmatism method.

The detected output signal Wa and the detected output signal Wb are supplied to an adding section 99 from which there is derived a sum output signal Wa +Wb. The detected output signal Wc and the detected output signal Wd are supplied to an adding section 100 from which there is derived a sum output signal Wc+Wd. A subtracting section 101 subtracts the sum output signal Wa +Wb and the sum output signal Wc+Wd from each other thereby to generate a difference output signal (Wa+Wb)−(Wc+Wd).

Further, a detected output signal Wg and a detected output signal Wh are supplied to a subtracting section 102 from which there is derived a difference output signal Wg−Wh. A subtracting section 103 subtracts the difference output (Wa+Wb) −(Wc+Wd) and the difference output signal Wg−Wh from each other thereby to generate a difference output signal [(Wa+Wb)−(Wc+Wd)]−(Wg−Wh) as the tracking error signal St. That is, in that case, on the basis of the reflected 0'th order laser beam L0' and the reflected primary diffracted laser beam L1b', the tracking error signal St is generated according to a so-called differential push-pull method.

As is set out, according to the disk recording and reproducing apparatus of the present invention, when a new information is recorded on a disk-shaped record medium or when the information already recorded on the disk-shaped record medium is partly changed, corrected or new information is additionally recorded thereon, a sub beam is introduced into the disk-shaped record medium at its recording track located in the outer peripheral portion side or in the inner peripheral portion side of the recording track on which a main beam becomes incident and the information is read-out from the delayed recording track or the advanced recording track relative to the recording track in which the information is recorded at the incident position of the main beam by the sub beam. A read-out information signal based on a detected output which results from detecting the information-reading sub beam by a photo-detecting means, is temporarily written in a memory means and then read-out therefrom at a predetermined read-out rate. Also, the information is readout from the recording track by the sub beam under the condition that the linear velocity of the sub beam relative to the recording track is made substantially equal to the linear velocity of the main beam relative to the recording track in the recording mode in which the information is recorded on the recording track. Therefore, a reproduced information output obtained on the basis of the read-out information read-out from the memory means and in which the information recorded on the recording track is properly reproduced is used to detect a position at which the partial change, correction or the additional recording should be effected when the monitoring is performed on the recording of new information on the recording track or when the information recorded on the disk-shaped record medium is partly changed, corrected or a new information is additionally recorded thereon. Under the condition that the information recording laser beam is introduced into the disk-shaped record medium at a constant linear velocity relative to the recording track, the monitoring on the recording of new information on the disk-shaped record medium or the search playback used to search the recorded information when the information recorded on the disk-shaped record medium is partly changed, corrected or the new information is additionally recorded thereon can be carried out properly with ease by an inexpensive optical system of relatively simple arrangement using a single laser beam generating source and a control system thereof.

Having described a preferred embodiment of the present invention with reference to the accompanying drawings, it is to be understood that the invention is not limited to that precise embodiment and that various changes and modifications could be effected by one skilled in the art without departing from the spirit or scope of the novel concepts of the invention as defined in the appended claim.

We claim as our invention:

1. A disk recording an reproducing apparatus using two light beams comprising:
- a disk driving section for loading thereon a disk-shaped record medium having recording tracks in and from which information is recorded and reproduced and for rotating said disk-shaped record medium at a constant linear velocity relative to an optical head;
- an optical section including the optical head and comprised of a light beam generating source, a light beam splitting means for splitting a light beam from said light beam generating source to provide a main beam and a sub beam, an optical path forming means for causing said main beam to be incident on a recording track for recording information therein and said sub beam to be incident on an adjacent recording track following said recording track on which said main beam is incident in said disk-shaped record medium loaded on said disk driving section and a photodetecting means for detecting a condition that said sub beam reflected from said disk-shaped record medium loaded on said disk driving section is affected by information recorded in said recording track on which said sub beam is incident, wherein said optical section provides a second sub beam incident on an adjacent recording track ahead of said recording track on which said main beam is incident and includes a second photo-detecting means for detecting information in said second sub beam reflected from said record medium;
- a disk rotation control section for controlling said disk driving section such that a linear velocity of said recording track on said disk-shaped record medium rotated by said disk driving section relative to said main beam incident on said recording track is constant;
- a recording operation section supplied with information to be recorded and causing said information to be recorded in said recording track on which said main beam is incident;
- a first reproducing operation section including memory means for generating a read-out information signal based on a detected output of said sub beam from said photodetecting means, clock signal reproducing means for extracting a sub beam clock signal from the read-out information signal detected from said recording track following said recording track on which said main beam is incident for writing a resultant read-out information signal in said memory means at a writing rate corresponding to said sub beam clock signal and reading out the signal written in said memory means at a predetermined reading rate to generate a reproduced information output for monitoring information recorded by said main beam;
- a second reproducing operation section including a second memory means for generating a second read-out information signal based on a detected output of said second sub beam from said second photo-detecting means and second clock signal reproducing means for extracting a second sub beam clock signal from the read out information signal detected from said recording track ahead of said recording track on which said main beam is incident for writing a resultant read-out information signal in said second memory means at a writing rate corresponding to said second sub beam clock signal and reading out the information signal written in said second memory means at said predetermined reading rate to generate a search output signal; and
- cross fade means receiving said information to be recorded and said search output signal for cross fading said search output signal into said information to be recorded with a resultant signal being recorded by said main beam incident on said recording track.

2. The disk recording and reproducing apparatus according to claim 1, in which said optical section further includes a main beam photo-detecting means for detecting a main beam reflected from said recording track, and further comprising:
- a third reproducing operation section for generating a read out operation signal based on a detected output from said main beam photo-detecting means and a main beam clock signal reproducing means for extracting a main beam clock signal from said read-out operation signal, and a decoder for decoding said signal from said main beam photodetecting means using said main beam clock signal to generate a main beam read out signal.

* * * * *

UNITED STATES PATENT AND TRADEMARK OFFICE
CERTIFICATE OF CORRECTION

PATENT NO. : 5,239,529
DATED : August 24, 1993
INVENTOR(S) : Satoru Tobita, Teruaki Higashihara,
              Kazuyuki Hishida, Masaru Tezuka It is certified that error appears in the above-indentified patent and that said Letters Patent is hereby corrected as shown below:

```
Col.  1, line 19, after "product" insert --,--
Col.  3, line 12, after "is" insert --,--
         line 18, after "of" insert --the--
Col.  7, line  6, after "example" insert --,--
Col.  9, line  6, after "of" insert --the--
         line 29, change "ABF" to --ARF--
Col. 10, line 14, change "LO" to --L0,--

Col. 15, line  1, change "an" to --and--
```

Signed and Sealed this

Eleventh Day of October, 1994

Attest:

BRUCE LEHMAN

Attesting Officer     Commissioner of Patents and Trademarks